J. CUSTER.
Land-Roller.
No. 63,224.                                   Patented Mar. 26, 1867.
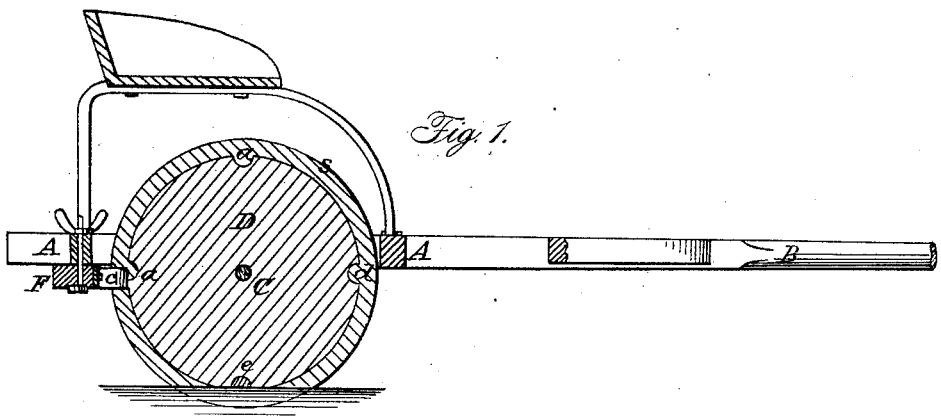
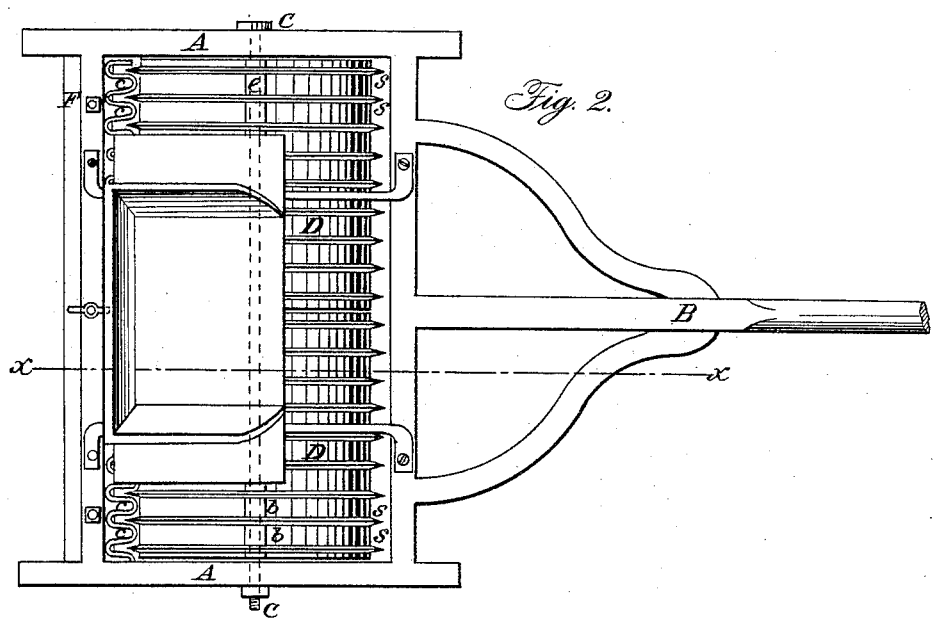
Witnesses:                                    Inventor:

United States Patent Office.

JOHN CUSTER, OF CORSICA, OHIO.

*Letters Patent No. 63,224, dated March 26, 1867.*

---

IMPROVEMENT IN ROLLERS FOR PULVERIZING SOIL AND CLODS.

---

*The Schedule referred to in these Letters Patent and making part of the same.*

---

TO ALL WHOM IT MAY CONCERN:

Be it known that I, JOHN CUSTER, of Corsica, in the county of Morrow, and State of Ohio, have invented certain new and useful improvements on Machine for Crushing and Pulverizing Clods of Earth; and I do hereby declare that the following is a full, clear, and exact description thereof, which will enable those skilled in the art to make and use the same, reference being had to the acompanying drawings, forming part of this specification, in which—

Figure 1 is a section of my improved crushing and pulverizing machine, taken in the line $x\,x$, fig. 1.

Figure 2 is a top view of the same.

Similar letters of reference indicate corresponding parts.

This invention relates to improvements in a machine for crushing and pulverizing clods of earth after the ground has been ploughed, for which Letters Patent were granted to me, dated the 26th day of June, 1866. The improvements consist in the manner of forming and securing the circular cutters upon the rollers, and of forming and connecting the cleaners or scrapers between the cutters. In all other respects the machine is constructed as described in the patent aforesaid, and the objects and operation of the invention are the same.

A represents a rectangular frame, and B the draught-pole attached thereto; C is a shaft which passes transversely through the frame A, and carries two rollers, D D, upon which the cutters $s\,s$ are placed. These cutters are formed of flat iron or steel annular plates, or single rings, which may be made about one inch wide at the base, and two or more inches in depth or height from the periphery of the rollers; and they are placed equidistant thereon, three or four inches apart. Instead of making the cutters $s\,s$ in sections, secured to the rollers by flanges and bolts, as in my patent aforesaid, they are made in one piece having four or more projections, $a\,a$, on the base or inner side, which fit into corresponding grooves, $e\,e$, made longitudinally on the periphery of the rollers D D, as shown in fig. 1, in and upon which they are firmly held in place by keys or wedge-blocks, $b\,b$, also fitted and fastened in the grooves $e\,e$, on the rollers between the cutters $s\,s$, as shown clearly in fig. 2. The ring-cutters $s\,s$, thus formed in one piece, have the advantage of a continuous knife-edge without the breaks that are apt to occur when made in sections. This continuity of the edge renders the cutters more effective and facile in their operation, while their construction and the mode of securing them to the rollers are very simple and cheap. Instead of hinged cleaners made of notched or serrated metal plates, as in my patent aforesaid, under the cross-bar F, and at the rear of the frame A, I place a long strip of metal plate so bent or corrugated that the corrugations or volutes, $c\,c$, thereof, shall, on one side, occupy the space between the ring-cutters $s\,s$, and their thin sides and edges shall lie so close to them as to perform perfectly the office of scrapers to clear away all adhering earth at every revolution of the rollers. With this form of the scrapers the earth cannot accumulate and clog on the thin edges and sides of the cleaners or scrapers, as it will against plates with serrated edges presenting their flat sides to the earth, but will pass freely through the open spaces in the volutes $c\,c$, as soon as it is scraped off of the cutters $s\,s$. The corrugated metal strip is fastened to the bar F by screws at the bottom of each corrugation opposite the edge of the cutters $s\,s$, as shown in fig. 2.

Having thus described my invention, what I claim as new, and desire to secure by Letters Patent, is—

1. The continuous single-ring cutters $s\,s$, secured by projections $a\,a$, in grooves $e\,e$, upon the periphery of the rollers D D, arranged as and for the purposes herein described.

2. The cleaners or scrapers formed of a corrugated metal plate secured to the cross-bar F, with the corrugations or volutes $c\,c$, placed between the cuttters $s\,s$ in the manner and for the purpose herein described.

JOHN CUSTER.

Witnesses:
JACOB L. DAY,
DANIEL CUSTER.